United States Patent
Miyakawa et al.

(10) Patent No.: US 10,884,877 B2
(45) Date of Patent: Jan. 5, 2021

(54) INFORMATION PROCESSING DEVICE, INFORMATION PROCESSING METHOD, AND NON-TRANSITORY COMPUTER READABLE MEDIUM

(71) Applicant: PFU Limited, Ishikawa (JP)

(72) Inventors: Osamu Miyakawa, Ishikawa (JP); Hitoshi Matsuo, Ishikawa (JP); Souichi Yoshida, Ishikawa (JP); Tadayoshi Kagawa, Ishikawa (JP); Ryou Matsuura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/150,963

(22) Filed: Oct. 3, 2018

(65) Prior Publication Data

US 2020/0004647 A1 Jan. 2, 2020

(30) Foreign Application Priority Data

Jun. 29, 2018 (JP) .................................. 2018-124559

(51) Int. Cl.
*G06F 9/4401* (2018.01)
*G06F 11/14* (2006.01)

(52) U.S. Cl.
CPC .......... *G06F 11/1471* (2013.01); *G06F 9/441* (2013.01); *G06F 11/1466* (2013.01)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS 6,487,718 B1 * 11/2002 Rodriguez ................ G06F 8/63
709/203
7,225,448 B2 * 5/2007 Himmel ................ G06F 1/3203
710/19
(Continued)

FOREIGN PATENT DOCUMENTS

JP 2009-176151 A 8/2009
JP 2016-046565 A 4/2016

OTHER PUBLICATIONS

Definition of "Virtual Machine Snapshot (VM Snapshot)", techopedia.com; Mar. 19, 2013; retrieved from https://www.techopedia.com/definition/16821/virtual-machine-snapshot-vm-snapshot on May 9, 2020 (Year: 2013).*

(Continued)

*Primary Examiner* — Daniel C. Chappell
(74) *Attorney, Agent, or Firm* — McDermott Will & Emery LLP

(57) ABSTRACT

The present invention provides an information processing device comprising a memory; a non-volatile memory; and a processor coupled to the memory and the non-volatile memory, the processor configured to: store in the non-volatile memory a snapshot of the memory in a state where a part of an activation process is implemented; and implement the activation process by using the snapshot stored in the non-volatile memory. More specifically, store in the non-volatile memory a snapshot of the main memory in a state before feeding a program to the external memory in an activation process using the main memory and the external memory; and implement at least a process of feeding a program for an external memory to the external memory from the main memory.

5 Claims, 6 Drawing Sheets

Activation process (S30)

(58) Field of Classification Search
CPC ........... G06F 8/00–78; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 8,151,100 | B2* | 4/2012 | Rofougaran | G06F 9/441 713/2 |
| 8,458,419 | B2* | 6/2013 | Basler | G06F 11/1464 711/161 |
| 8,561,138 | B2* | 10/2013 | Rothman | G06F 21/575 726/2 |
| 8,788,746 | B2* | 7/2014 | Matsushima | H04N 1/00928 711/105 |
| 9,064,117 | B1* | 6/2015 | Worsley | G06F 11/1415 |
| 9,389,877 | B2* | 7/2016 | Galicia | G06F 9/441 |
| 9,606,809 | B2* | 3/2017 | Zhang | G06F 9/4401 |
| 9,766,944 | B2* | 9/2017 | Zhang | G06F 9/441 |
| 9,804,857 | B2* | 10/2017 | Sengupta | G06F 9/441 |
| 10,078,361 | B2* | 9/2018 | Sanghi | G06F 9/4405 |
| 2003/0126242 | A1* | 7/2003 | Chang | G06F 9/4416 709/222 |
| 2004/0194086 | A1* | 9/2004 | Suzaki | G06F 9/4856 718/100 |
| 2005/0038932 | A1* | 2/2005 | Himmel | G06F 9/4406 710/15 |
| 2005/0038933 | A1* | 2/2005 | Himmel | G06F 1/3203 710/15 |
| 2005/0038960 | A1* | 2/2005 | Himmel | G06F 9/4406 711/115 |
| 2005/0240830 | A1* | 10/2005 | Kubo | G06F 11/006 714/45 |
| 2010/0205421 | A1* | 8/2010 | Campbell | G06F 11/1417 713/2 |
| 2012/0131320 | A1* | 5/2012 | Park | G06F 9/4401 713/2 |
| 2012/0323853 | A1* | 12/2012 | Fries | G06F 11/3072 707/649 |
| 2016/0057304 | A1 | 2/2016 | Yamaguchi et al. | |
| 2017/0024224 | A1* | 1/2017 | Bakke | G06F 9/45558 |
| 2017/0249002 | A1* | 8/2017 | Costa | G06F 9/4403 |
| 2017/0315818 | A1* | 11/2017 | Shivanna | G06F 11/1417 |
| 2019/0227865 | A1* | 7/2019 | Yamada | G06F 11/0751 |

OTHER PUBLICATIONS

What is a quiesced snapshot vs a standard snapshot?; Citrix Discussions, Tobias Kriedel; Apr. 28, 2014; retrieved from https://discussions.citrix.com/topic/350874-what-is-a-quiesced-snapshot-vs-a-standard-snapshot/ on Jul. 31, 2020 (Year: 2014).*

* cited by examiner

Snapshot creation process (S10)

Language selection snapshot process (S20)

Activation process (S30)

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-124559 filed Jun. 29, 2018.

FIELD

The present invention relates to an information processing device, an information processing method, and a non-transitory computer readable medium.

BACKGROUND ART

For example, Japanese Patent Application Laid-Open (JP-A) No. 2009-176151 discloses an information processing device configured to shorten a device activation time by directly writing a snapshot image of a command code and data of a subject software program developed and executed on a RAM, into a memory.

Further, Japanese Patent Application Laid-Open (JP-A) No. 2016-046565 discloses an image formation device including a returning unit configured to read a snapshot associated with an activation factor from a flash memory and store the same into an RAM.

SUMMARY OF THE INVENTION

According to an aspect of the invention, there is provided an information processing device comprising a memory; a non-volatile memory; and a processor coupled to the memory and the non-volatile memory, the processor configured to: store a snapshot of the memory into the non-volatile memory, in a state wherein a part of the activation process is implemented; and implement the activation process by using the snapshot stored in the non-volatile memory.

According to another aspect of the invention, there is provided an information processing method comprising the steps of: generating a snapshot of a memory in a state where an activation process is implemented up to somewhere in the process; and distributing the snapshot generated on the memory to another image reading device.

According to another aspect of the invention, there is provided a non-transitory computer-readable recording medium storing a program that causes a computer to execute a process comprising: a snapshot of a memory in a state where an activation process is implemented up to somewhere in the process.

BRIEF DESCRIPTION OF THE DRAWINGS

Exemplary embodiments of the present invention will be described in detail based on the following figures.

DESCRIPTION OF EMBODIMENTS

Background and Summary

To speed up an activation of an information processing device, there is a method in which a memory state after the activation of the device is entirely retreated as a snapshot and the snapshot is directly restored on a memory during a next activation of the device.

However, in the information processing device including not only a main memory but also an external memory, a state of the external memory can not be included into the snapshot. For example, in a radio LAN chip mounted in a scanner device, there is a dedicated firmware (chip firmware) which operates on a volatile memory in the chip, and thus, that part cannot be included in the snapshot. Thus, an initialization process of a radio LAN driver needs to be separately implemented after the snapshot is restored. With this, even if a snapshot activation is implemented, it is not possible to obtain the snapshot activation effect in an initialized portion of the radio LAN driver.

Therefore, the information processing device of the present embodiment stores the snapshot of a memory in a state where a part of the activation process is implemented and implements an activation process by using the stored snapshot. More specifically, it is not that a portion about the radio LAN driver is not included in the snapshot, but a state is maintained where the radio LAN driver is temporarily suspended immediately before the chip firmware is fed in the initialization process of the radio LAN driver (referred to as "init_pause"), and in this state, the snapshot is created. As a result, the portion of the initialization process of the radio LAN driver can be also partially shortened.

EMBODIMENT

Figure 1:
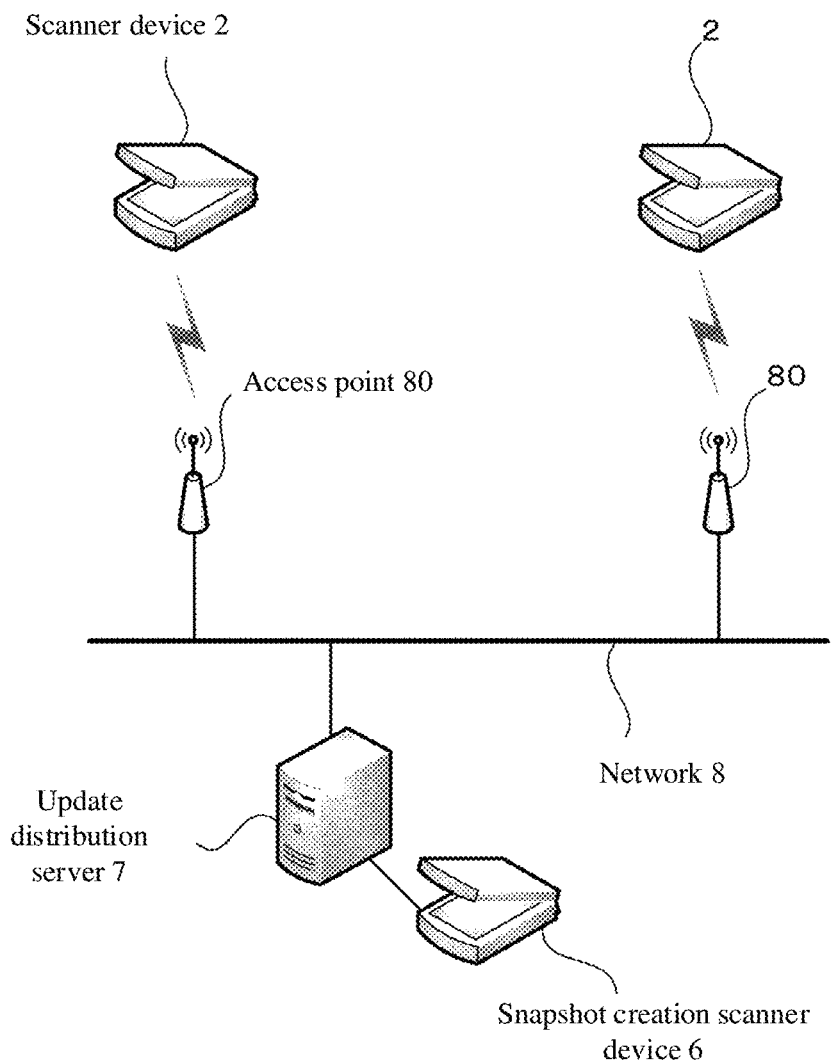
FIG. 1 is a drawing illustrating a whole configuration of an information processing system 1.

FIG. 1 is a drawing illustrating a whole configuration of an information processing system 1.

As illustrated in FIG. 1, the information processing system 1 includes a scanner device 2 and an update distribution server 7, and these components are connected to each other via an access point 80 and a network 8. In the information processing system 1, a scanner device 6 for creating the snapshot is further provided, and is connected to the update distribution server 7.

The scanner device 2 is an image reading device configured to read an image to generate image data, and incorporates an information processing unit 20 (described later) configured to process the read image data.

The scanner device 6 for creating the snapshot has a configuration substantially similar to the scanner device 2.

The update distribution server 7 uses the scanner device 6 for creating the snapshot to create an activation program (including the snapshot) for activating the scanner device 2. It is noted that in the present example, a mode is described as a specific example, where when distributing an update program (a program for updating a firmware or the like) to the scanner device 2, the update distribution server 7 distributes an updated activation program (including the snapshot) via the network 8; however, this is not limiting. For example, the scanner device 2 at the time of shipment from a factory may write an activation program created by the update distribution server 7 via a recording medium such as a USB cable and a CD-ROM, into the scanner device 2.

Figure 2:
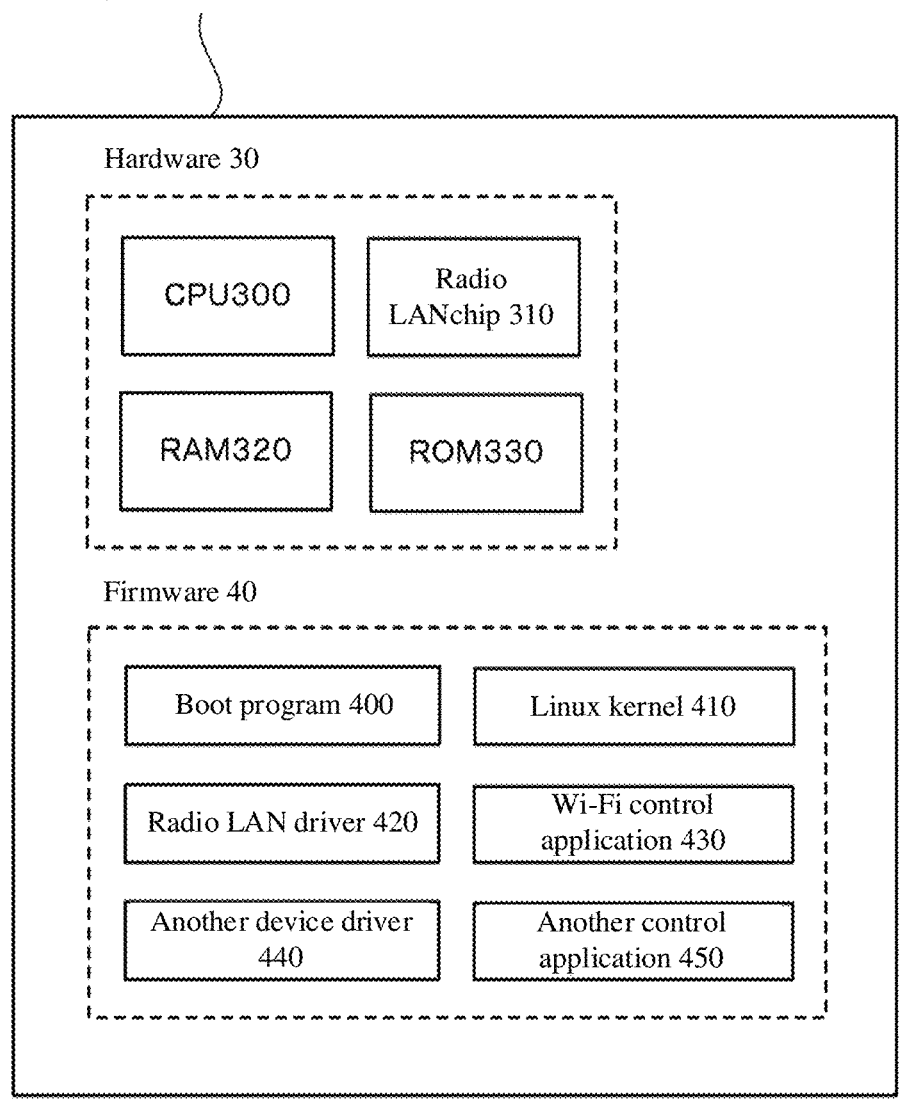
FIG. 2 is a drawing illustrating a hardware configuration and a software configuration of the information processing unit 20 incorporated in the scanner device 2.

FIG. 2 is a drawing illustrating a hardware configuration and a software configuration of the information processing unit 20 incorporated in the scanner device 2.

As illustrated in FIG. 2, the information processing unit 20 includes, as a hardware 30, a CPU 300, a radio LAN chip 310, a RAM 320, and a ROM 330.

The CPU 300 is a central processing unit.

The radio LAN chip 310 is a chip for performing a radio connection, and realizes a Wi-Fi connection, for example. It is noted that the volatile memory on the radio LAN chip 310 is an example of an external memory according to the present invention; however, this is not limiting.

The RAM 320 is a volatile memory, and functions as a main memory (main storage device).

The ROM 330 is a non-volatile memory such as a Flash ROM, and stores therein an activation program including the snapshot, for example.

Further, as illustrated in FIG. 2, the information processing unit 20 includes, as a firmware 40, a boot program 400, a Linux kernel 410, a radio LAN driver 420, a Wi-Fi control application 430, another device driver 440, and another control application 450.

The boot program 400 is a boot program for activating the scanner device 2.

The Linux kernel 410 is an example of an operating system (OS), and is a core portion of Linux.

The radio LAN driver 420 is a driver for the radio LAN chip 310.

The Wi-Fi control application 430 controls the radio LAN chip 310 via the radio LAN driver 420 to realize the Wi-Fi connection to the access point 80.

Another device driver 440 is a driver for a liquid crystal display and a touch panel, for example.

Another control application 450 is an application program for controlling, for example, a liquid crystal display and a touch panel to perform reception of a user input, a display of an input result and the like.

Figure 3:
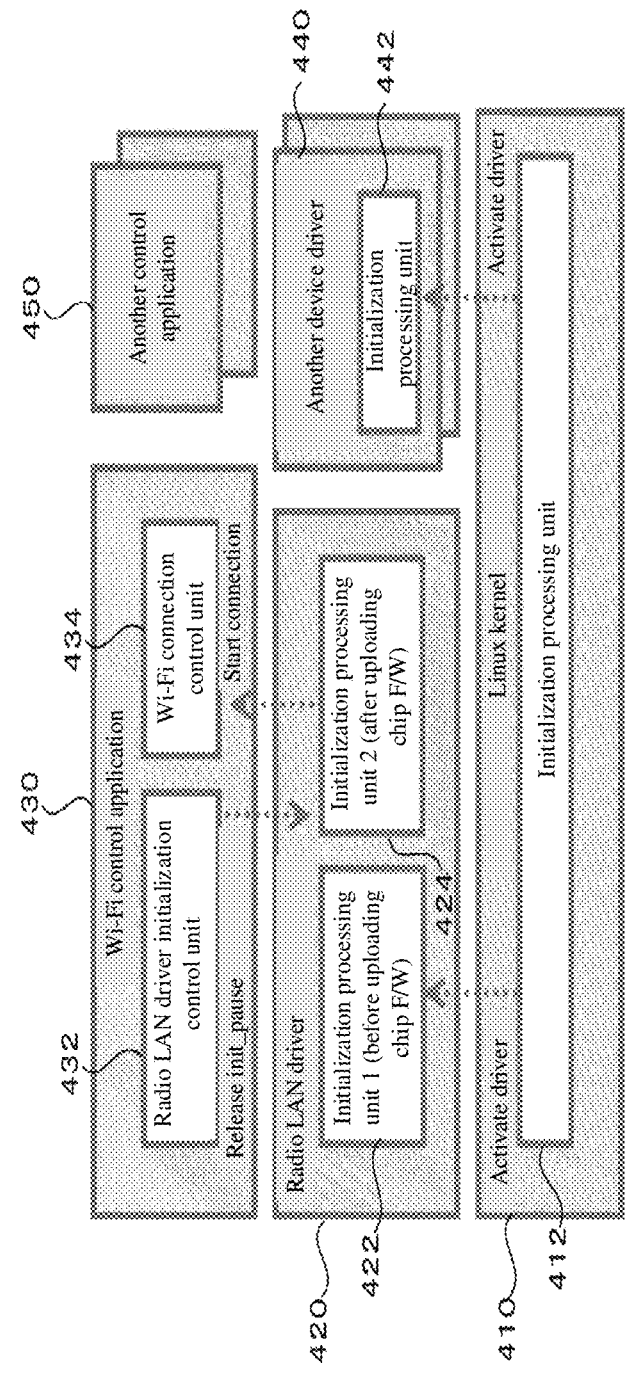
FIG. 3 is a drawing for describing an activation order of a firmware 40 in the activation process of the scanner device 2.

FIG. 3 is a drawing for describing an activation order of a firmware 40 in the activation process of the scanner device 2.

As illustrated in FIG. 3, an initialization processing unit 412 of the Linux kernel 410 performs an initialization process of itself to instruct the radio LAN driver 420 and the another device driver 440 to be activated.

The radio LAN driver 420 includes a first initialization processing unit 422 configured to implement an initialization process before an upload of the chip firmware, and a second initialization processing unit 424 configured to implement an initialization process after the upload of the chip firmware (subsequent activation process).

A Wi-Fi control application 430 includes a radio LAN driver initialization control unit 432 configured to control initialization of the radio LAN driver 420, and a Wi-Fi connection control unit 434 configured to control a Wi-Fi connection process. Upon completion of restoring of the snapshot, the radio LAN driver initialization control unit 432 instructs the second initialization processing unit 424 of the radio LAN driver 420 to release init_pause. In response thereto, the second initialization processing unit 424 of the radio LAN driver 420 starts feeding the chip firmware.

Another device driver 440 includes an initialization processing unit 442.

Figure 4:
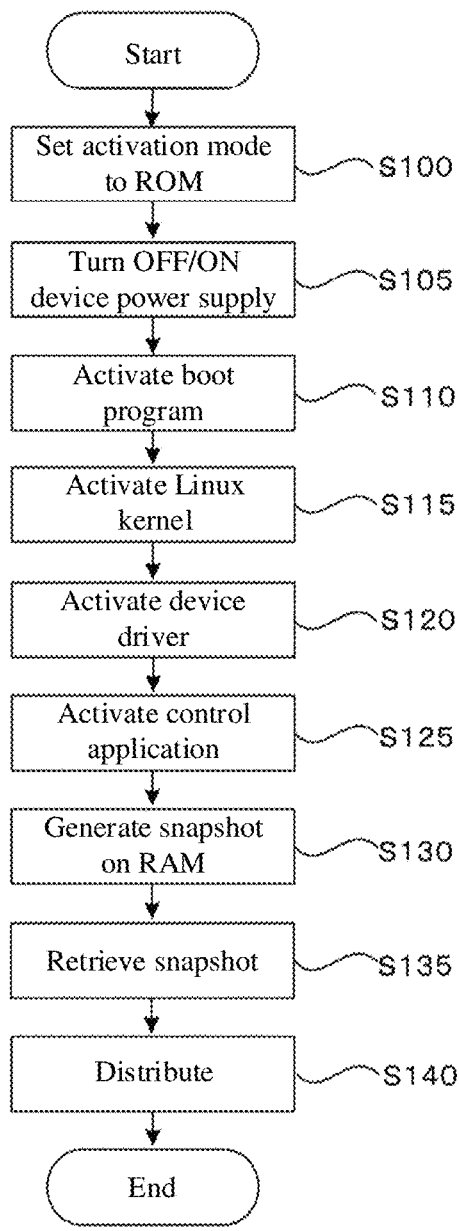
FIG. 4 is a flowchart describing a snapshot creation process (S10) of the update distribution server 7.

FIG. 4 is a flowchart describing a snapshot creation process (S10) of the update distribution server 7. In the present example, a case is described as a specific example, where a user installs an update program into the scanner device 6 for creating the snapshot, and operates the scanner device 2 via the update distribution server 7 to create and distribute the snapshot in a state where an update is applied.

As illustrated in FIG. 4, in step 100 (S100), when the user instructs a setting of a snapshot creation mode, the scanner device 6 writes the activation mode being the snapshot creation mode into the ROM 330 such as EEPROM.

In step 105 (S105), the scanner device 6 turns OFF the power supply by shutting down the information processing unit 20 (FIG. 2), in accordance with a user operation. Subsequently, the scanner device 6 turns ON the power supply in accordance with the user operation.

In step 110 (S110), when the power is supplied to the scanner device 6, the boot program 400 (FIG. 2, FIG. 3) of the scanner device 6 is activated to refer to an activation mode (in this example, the snapshot creation mode) written into the ROM 330.

In step 115 (S115), when it is determined that the activation mode is the snapshot creation mode, the boot program 400 loads the Linux kernel 410 for activation.

In step 120 (S120), the Linux kernel 410 activates each driver. During that time, the Linux kernel 410 in the present example temporarily suspends the radio LAN driver 420 at a stage corresponding to the first initialization processing unit 422 (stage immediately before the chip firmware is fed), and suspends the activation process in an init_pause state.

In step 125 (S125), each control application (the Wi-Fi control application 430 and the another control application 450) are activated.

In step 130 (S130), the update distribution server 7 instructs the scanner device 6 to generate the snapshot image on the RAM 320. At this time, the initialization process is completed for the Wi-Fi control application 430, the another device driver 440, the another control application 450, and a portion corresponding to the first initialization processing unit 422 of the radio LAN driver 420, and the initialization process is not completed for a portion corresponding to the second initialization processing unit 424 of the radio LAN driver 420.

In step 135 (S135), the update distribution server 7 extracts, as a snapshot file, the snapshot image generated on the RAM 320.

In step 140 (S140), the update distribution server 7 combines the snapshot file extracted from the RAM 320 of the scanner device 6 and another file, and distributes, as an activation program, to another scanner device 2 via the network 8.

Thus, the update distribution server 7 temporarily suspends the scanner device 6 for creating the snapshot while the activation process of the firmware is executed up to somewhere in the process, and creates the snapshot in a temporarily suspended state.

Figure 5:
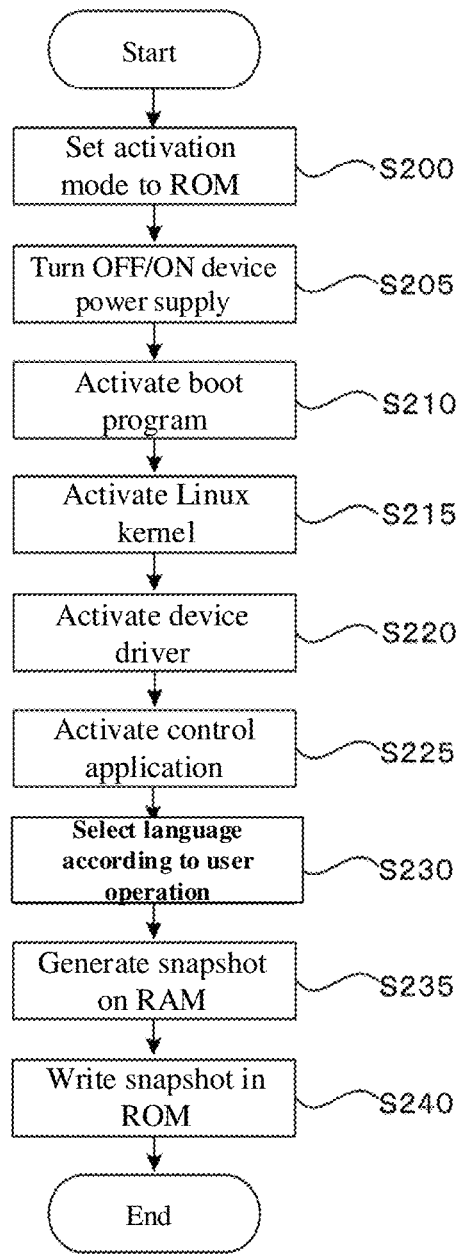
FIG. 5 is a flowchart describing a snapshot creation process (S20) after a language selection, as another embodiment of the present invention.

FIG. 5 is a flowchart describing a snapshot creation process (S20) after a language selection, as another embodiment of the present invention. In the present example, a case is described where after the user activates the scanner device 2 and selects a language to be used in a user interface of the scanner device 2, the snapshot including this state is created. In this case, the snapshot is created and stored by the scanner device 2 only.

As illustrated in FIG. 5, in step 200 (S200), when the user selects the language on a language setting screen of a setting menu, the scanner device 2 writes the selected language and the activation mode being the snapshot creation mode, into the ROM 330 such as EEPROM.

In step 205 (S205), the scanner device 2 shuts down the information processing unit 20 (FIG. 2), in accordance with a user operation, turns OFF the power supply, and thereafter, turns ON the power supply of the device.

In step 210 (S210), when the power is supplied to the scanner device 2, the boot program 400 (FIG. 2, FIG. 3) of the scanner device 2 is activated to refer to an activation mode (in this example, the snapshot creation mode) written into the ROM 330.

In step 215 (S215), when it is determined that the activation mode is the snapshot creation mode, the boot program 400 loads the Linux kernel 410 for activation.

In step 220 (S220), the Linux kernel 410 activates each driver. During that time, the Linux kernel 410 in the present example temporarily suspends the radio LAN driver 420 at a stage corresponding to the first initialization processing unit 422, and suspends the activation process in an init_pause state.

In step 225 (S225), each control application (the Wi-Fi control application 430 and the another control application 450) are activated.

In step 230 (S230), the firmware 40 performs a language setting change in accordance with the language written into the ROM 330.

In step 235 (S235), the scanner device 2 generates the snapshot image on the RAM 320 in a state where the language setting change is performed.

In step 235 (S235), the scanner device 2 writes the snapshot image generated on the RAM 320, into the ROM 330, and changes the activation mode to a normal activation mode.

Thus, when the user changes the language setting, the scanner device 2 automatically generates the snapshot in a state where the language setting is changed. If the snapshots for high-speed activation as much as the number of languages are prepared and written in the ROM, the data size increases, and thus, as described above, the scanner device 2 in the present example takes the snapshot again when the language setting is changed to prevent a wasted use of a resource.

Figure 6:
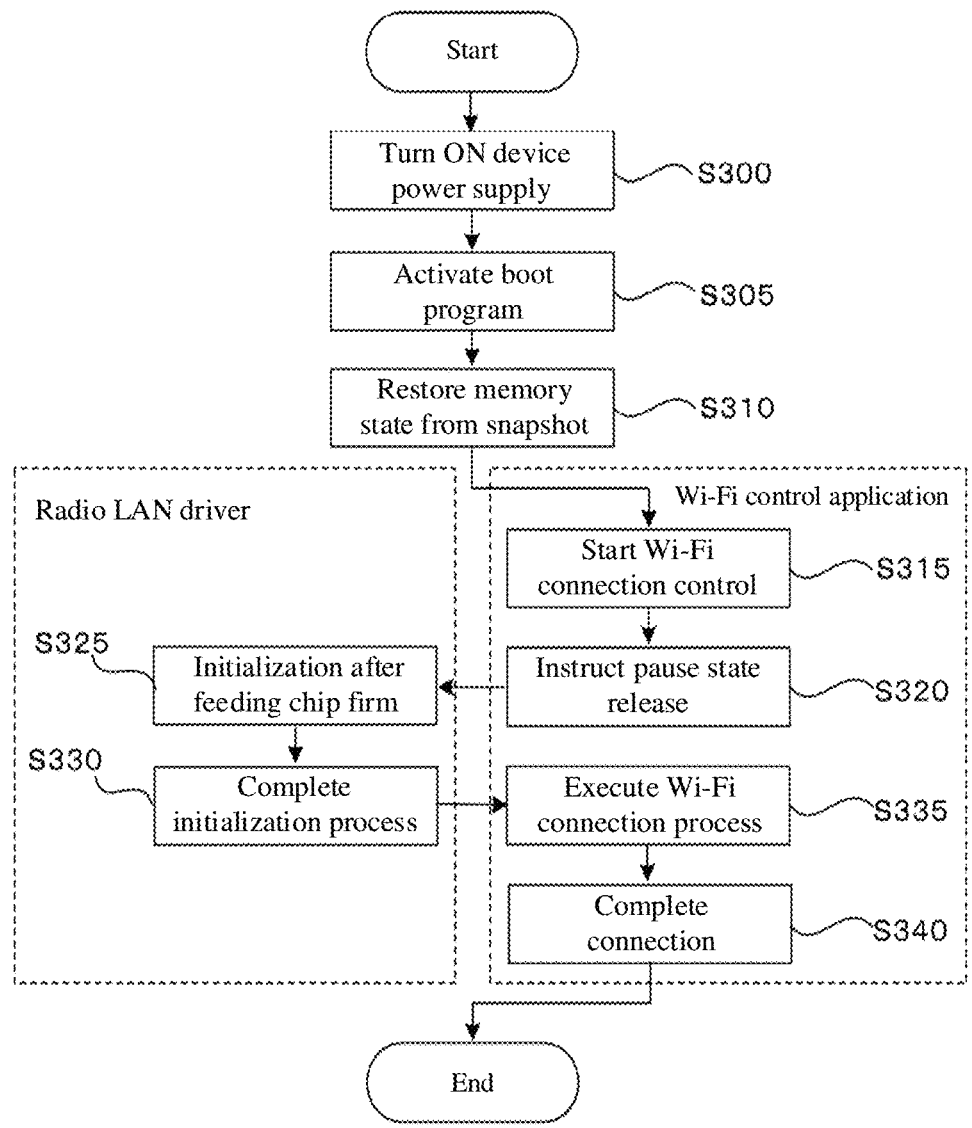
FIG. 6 is a flowchart describing the activation process (S30) of the scanner device 2 in the normal activation mode.

FIG. 6 is a flowchart describing the activation process (S30) of the scanner device 2 in the normal activation mode.

As illustrated in FIG. 6, in step 300 (S300), the scanner device 2 turns ON the power supply in accordance with the user operation. It is noted that after receiving the update program, the scanner device 2 itself may perform the process of turning ON the power supply.

In step 305 (S305), when the power is supplied to the scanner device 2, the boot program 400 (FIG. 2, FIG. 3) of the scanner device 2 is activated to refer to the activation mode (in this example, the normal activation mode) written into the ROM 330.

In step 310 (S310), upon determination that the activation mode is the normal activation mode, the boot program 400 reads the snapshot from the ROM 330 and develops the same into the RAM 320 to restore the memory state. At this time, the radio LAN driver 420 is in the init_pause state, as illustrated in FIG. 3, and the another device driver 440 is in a state where the initialization process is completed.

In step 315 (S315), the Wi-Fi connection control unit 434 of the Wi-Fi control application 430 starts a Wi-Fi connection control.

In step 320 (S320), the radio LAN driver initialization control unit 432 of the Wi-Fi control application 430 instructs the radio LAN driver 420 to release the init_pause state.

In step 325 (S325), in response to the instruction from the radio LAN driver initialization control unit 432, the second initialization processing unit 424 of the radio LAN driver 420 releases the init_pause state, and starts feeding the chip firmware to implement a subsequent initialization process.

In step 330 (S330), upon completion of the initialization of the radio LAN driver 420, the second initialization processing unit 424 of the radio LAN driver 420 notifies the Wi-Fi control application 430 of the completion.

In step 335 (S335), in response to the completion notification from the radio LAN driver 420, the Wi-Fi control application 430 continues the Wi-Fi connection control.

In step 340 (S340), the Wi-Fi control application 430 completes the Wi-Fi connection process, and the scanner device 2 completes the activation process.

Thus, the scanner device 2 uses the snapshot in a state where a part of the activation process is implemented to enable a high-speed activation.

As described above, the scanner device 2 of the present embodiment uses the snapshot in a state where the activation process is partially implemented to enable a high-speed activation.

Further, when the language setting is changed, the scanner device 2 in the present example takes the snapshot again in a state where the language setting is reflected, and thus, it is possible to suppress a data amount of the Snapshot to be written into the non-volatile memory.

Further, the update distribution server 7 in the present example creates and distributes the snapshot of the updated program, and thus, it is possible to provide a high-speed activation even after the program is updated.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a memory;
   a non-volatile memory; and
   a processor coupled to the memory and the non-volatile memory, the processor configured to:
   suspend an activation process in an init_pause state to generate a snapshot of the memory, when it is determined that an activation mode is a snapshot creation mode;
   store in the non-volatile memory the generated snapshot of the memory in a state where a part of an activation process is implemented; and implement the activation process by using the snapshot stored in the non-volatile memory, when it is determined that the activation mode is a normal activation mode; and release the init_pause state to implement the remaining activation process after using the snapshot stored in the non-volatile memory, wherein suspending the activation process in the init_pause state includes a driver of a radio LAN chip being temporarily suspended immediately before firmware of the radio LAN chip is fed in an initialization process of the driver of the radio LAN chip.

2. The information processing device according to claim 1, wherein the processor is further configured to implement the remaining activation process after using the snapshot stored in the non-volatile memory.

3. The information processing device according to claim 2, wherein the processor is further configured to store in the non-volatile memory a snapshot of a state where an activation process using a main memory and an external memory is partly implemented.

4. The information processing device according to claim 3, wherein the processor is further configured to:

store in the non-volatile memory a snapshot of the main memory in a state before feeding a program to the external memory in an activation process using the main memory and the external memory; and implement at least a process of feeding a program for an external memory to the external memory from the main memory.

5. The information processing device according to claim 1, wherein the processor is further configured to:

generate a snapshot of the memory after a language setting of a non-transitory computer readable medium is performed;

store the generated snapshot in the non-volatile memory; and implement an activation process remaining after the language setting is performed, based on the snapshot stored in the non-volatile memory.

* * * * *